US008748535B2

(12) United States Patent
Doshev et al.

(10) Patent No.: US 8,748,535 B2
(45) Date of Patent: Jun. 10, 2014

(54) HETEROPHASIC POLYPROPYLENE WITH IMPROVED BALANCE BETWEEN STIFFNESS AND TRANSPARENCY

(75) Inventors: Petar Doshev, Linz (AT); Rao Kona Balakantha, Linz (AT); Pirjo Jaaskelainen, Porvoo (FI); Bo Malm, Espoo (FI)

(73) Assignee: Borealis AG, Vienna (AT)

( * ) Notice: Subject to any disclaimer, the term of this patent is extended or adjusted under 35 U.S.C. 154(b) by 215 days.

(21) Appl. No.: 13/502,751

(22) PCT Filed: Dec. 14, 2010

(86) PCT No.: PCT/EP2010/007618
§ 371 (c)(1),
(2), (4) Date: Aug. 16, 2012

(87) PCT Pub. No.: WO2011/076354
PCT Pub. Date: Jun. 30, 2011

(65) Prior Publication Data
US 2013/0005902 A1  Jan. 3, 2013

(30) Foreign Application Priority Data
Dec. 23, 2009 (EP) .................................. 09015956

(51) Int. Cl.
*C08L 23/12* (2006.01)
*C08L 23/16* (2006.01)
*C08L 23/14* (2006.01)
*C08F 297/08* (2006.01)

(52) U.S. Cl.
USPC ................. 525/53; 525/191; 525/240; 526/65

(58) Field of Classification Search
CPC ......... C08L 23/04; C08L 23/06; C08L 23/08; C08L 23/0815; C08L 23/10; C08L 23/12; C08L 23/14; C08L 23/142; C08L 23/16; C08L 2205/02; C08L 2205/025; C08L 2205/035; C08L 2207/02; C08L 2666/06; C08F 2/001; C08F 297/083
USPC .............................. 525/53, 191, 240; 526/65
See application file for complete search history.

(56) References Cited

U.S. PATENT DOCUMENTS

2007/0203298 A1   8/2007   Massari et al.

FOREIGN PATENT DOCUMENTS

| EP | 0 373 660 | | 2/1996 |
| EP | 1 659 151 | | 5/2006 |
| EP | 1659151 A1 | * | 5/2006 |
| EP | 2 014 714 | | 1/2009 |
| EP | 2 022 824 | | 2/2009 |
| EP | 1 801 156 | | 12/2009 |
| WO | WO 99/24479 | | 5/1999 |
| WO | WO 99/24501 | | 5/1999 |

OTHER PUBLICATIONS

International Search Report mailed Jan. 27, 2011 for International application No. PCT/EP2010/007618.
Written Opinion mailed Jan. 27, 2011 for International application No. PCT/EP2010/007618.
Reply to Written Opinion dated Sep. 7, 2011 for International application No. PCT/EP2010/007618.
International Preliminary Report on Patentability completed Feb. 1, 2012 for International application No. PCT/EP/2010/007618.
Gahleitner, Marcus, et al., *Propylene-Ethylene Randon Copolymers: Comonomer Effects on Crystallinity and Application Properties*, Journal of Applied Polymer Science, vol. 95, pp. 1073-1081, 2005.
Encyclopedia of Polymer Science and Engineering, vol. 6, Emulsion Polymerization to Fibers, Manufacture, pp. 544-559, 1986.

* cited by examiner

*Primary Examiner* — Roberto Rabago
(74) *Attorney, Agent, or Firm* — Fay Sharpe LLP

(57) ABSTRACT

The present invention relates to a heterophasic polypropylene composition with rather high melt flow rate, high stiffness, acceptable impact properties and an advantageous balance between stiffness and transparency. Still further, the present invention is also directed to a process for producing the inventive polypropylene composition, to an article made of the inventive polypropylene composition and to the use of the inventive polypropylene composition for the production of films and molded articles, such as thin-walled plastic containers for packaging. The inventive heterophasic polypropylene composition comprises at least a propylene homopolymer fraction, a propylene random copolymer fraction, two different ethylene-propylene rubber fractions and an ethylene homo- or copolymer fraction.

14 Claims, 1 Drawing Sheet

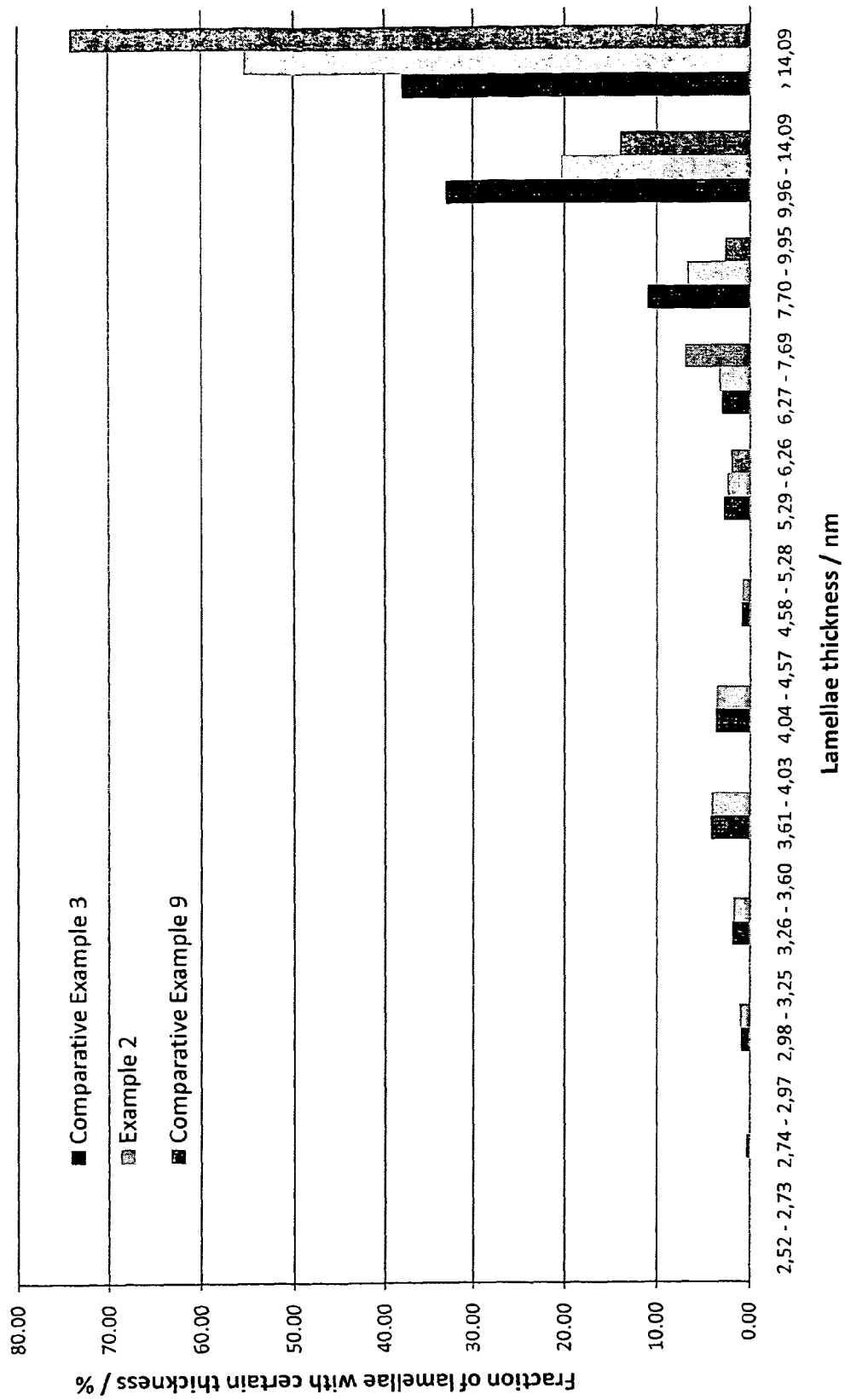

HETEROPHASIC POLYPROPYLENE WITH IMPROVED BALANCE BETWEEN STIFFNESS AND TRANSPARENCY

The present invention relates to a heterophasic polypropylene composition with rather high melt flow rate, high stiffness, acceptable impact properties and an advantageous balance between stiffness and transparency. Still further, the present invention is also directed to a process for producing the inventive polypropylene composition, to an article made of the inventive polypropylene composition and to the use of the inventive polypropylene composition for the production of films and moulded articles, such as thin-walled plastic containers for packaging.

In the field of thin-wall packaging of the moulding market it is of great importance to have a high flowing material with good mechanical properties, i.e. stiffness and acceptable impact strength. Good flowability is needed for achieving a good processability in various manufacturing methods of articles, e.g. extrusion and moulding processes, thereby allowing the high production speed required in this mass production market. The mechanical properties are also critical in view of the thin-walled articles. Particularly, in the field of containers there is a need to hold the content such as food contained therein as well as having sufficient stiffness to be stacked. Finally, the materials should also withstand mechanical compression damage, which is frequently incurred by e.g. dropping the articles.

Still further, also the transparency should be acceptable. Particularly, a good balance between stiffness and transparency is desirable. However, at least some of these objects may only be achieved at the expense of other of these objects.

Generally speaking, a high degree of crystallinity of polypropylene compositions renders the material rather stiff, however also increases the haze. The crystallinity is influenced by the amount of comonomer contained in the propylene copolymer and by the molecular weight of the polymer chains, i.e. by the molecular weight distribution. A higher amount of comonomer means more interruption of the isotactic polypropylene units and hence less crystallinity. To a certain extent this entails improved optical properties, i.e. better haze values. However, the stiffness is reduced thereby. Hence, the balance of stiffness and haze is of great importance.

A rather low molecular weight improves processability and crystallinity, hence stiffness, however, the impact strength is deteriorated.

Therefore, a general problem for polypropylene compositions is to reconcile the opposed requirements of high processability, stiffness, impact strength and good optical performance, i.e. low haze.

It is known in the art to combine a polypropylene homo- or copolymer matrix phase material with an elastomeric propylene-ethylene copolymer dispersed phase material (EPR rubber). These heterophasic polypropylenes often display better impact strength due to the rubber particles dispersed in the matrix phase. Particularly, the low temperature impact resistance is improved.

Since the matrix phase and the dispersed phase by definition do not build a homogeneous phase but two phases, also the optical performance may be affected due to the presence of phase boundaries in the material. If the particles of the dispersed phase are too large, i.e. reach the magnitude of the wavelength of light, the refractive indices of the matrix phase and the dispersed phase gain importance. In case of polyolefins, the refractive indices of the two phases may be tuned by controlling the density of the two phases. The size of the particles of the dispersed phase is inter alia influenced by the molecular weight or intrinsic viscosity of the two phases. Hence, an additional task is to carefully select the molecular weight or intrinsic viscosity and/or the density of the different phases.

EP 373 660 discloses a heterophasic polypropylene composition with good transparency and improved low temperature impact resistance comprising a crystalline copolymer of propylene with ethylene or an alpha-olefin and an elastomeric propylene-ethylene copolymer.

In further developing said heterophasic compositions EP 1 659 151 discloses a heterophasic polypropylene composition comprising a propylene homo- or copolymer matrix and a dispersed phase which comprises two elastomeric ethylene-propylene copolymer fractions which differ in ethylene content and intrinsic viscosity. Said composition further comprises a low density ethylene copolymer with an ethylene content of at least 80 mol %. Said compositions are suitable for molding and have a good balance between impact strength and stiffness, sufficient flowability and good optical properties.

Nevertheless, there is still a need for a heterophasic polypropylene composition which while keeping a good low temperature impact resistance has improved flowability, i.e. a high melt flow rate, as well as good stiffness and transparency.

Hence, it is an object of the present invention to provide such a material with an improved balance of said properties.

It has now surprisingly been found that the above objects can be achieved by a particular heterophasic polypropylene composition comprising (A) 40-70 wt % of a propylene homopolymer fraction,
(B) 10-50 wt % of a propylene random copolymer fraction,
(C) 1-20 wt % of a first elastomeric ethylene-propylene copolymer fraction,
(D) 1-20 wt % of a second elastomeric ethylene-propylene copolymer fraction, and
(E) 5-25 wt % of an ethylene homo- or copolymer fraction having a density between 905 and 925 kg/m$^3$, wherein the ratio of intrinsic viscosity of fraction (A) to the intrinsic viscosity of combined fractions (A) and (B) is smaller than 0.9,
the comonomer content of the propylene random copolymer fraction (B) is up to 5 wt %,
the first elastomeric ethylene-propylene copolymer fraction (C) has a different ethylene content than the second elastomeric ethylene-propylene copolymer fraction (D), and
the MFR$_2$ of the heterophasic polypropylene composition is at least 20 g/10 min, the values of MFR$_2$ being measured according to ISO 1133 (230° C., 2.16 kg load).

Preferably, the MFR$_2$ of the heterophasic polypropylene composition is at least 30 g/10 min, more preferably at least 35 g/10 min.

The MFR$_2$ of the heterophasic polypropylene composition will usually not be higher than 300 g/10 min.

The amount of fraction (A) in the heterophasic polypropylene composition is preferably in the range of 45-65 wt %.

The amount of fraction (B) in the heterophasic polypropylene composition is preferably in the range of 20-50 wt %.

The amount of fraction (C) in the heterophasic polypropylene composition is preferably in the range of 5-20 wt %, more preferably in the range of 5-15 wt %.

The amount of fraction (D) in the heterophasic polypropylene composition is preferably in the range of 1-15 wt %, more preferably in the range of 1-10 wt %.

The amount of fraction (E) in the heterophasic polypropylene composition is preferably in the range of 10-20 wt %.

The comonomer content of the propylene random copolymer fraction (B) is usually at least 0.5 wt %, preferably at least 1.0 wt %, still more preferably at least 2.5 wt %.

Particular preferred comonomers of the propylene random copolymer fraction (B) are selected from ethylene, 1-butene, 1-pentene, 1-hexene, 1-octene, 4-methyl-1-pentene or 3-methyl-1-pentene, or any combination of these. Most preferred is that the comonomer is ethylene.

Preferably, the ratio of intrinsic viscosity of fraction (A) to the intrinsic viscosity of combined fractions (A) and (B) is smaller than 0.8, still more preferably smaller than 0.7. Said ratio will be usually higher than 0.01.

Preferably, the $MFR_2$ of the propylene homopolymer fraction (A) is at least 45 g/10 min, more preferably at least 100 g/10 min, still more preferably at least 200 g/10 min.

The $MFR_2$ of the propylene homopolymer fraction (A) will usually not be higher than 1000 g/10 min.

Preferably, the $MFR_2$ of the propylene random copolymer fraction (B) is not higher than 45 g/10 min, more preferably not higher than 30 g/10 min, still more preferably not higher than 20 g/10 min.

The $MFR_2$ of the propylene random copolymer fraction (B) will usually at least 1 g/10 min.

Preferably, propylene homopolymer fraction (A) has a higher $MFR_2$-value than the propylene random copolymer fraction (B).

Preferably, the intrinsic viscosity of each of the elastomeric ethylene-propylene copolymer fractions (C) and (D) is not higher than 2.0 dl/g, more preferably not higher than 1.7 dl/g.

Preferably, the intrinsic viscosity of each of the elastomeric ethylene-propylene copolymer fractions (C) and (D) is at least 0.8 dl/g, more preferably at least 0.9 dl/g.

Preferably, the ethylene content of the first elastomeric ethylene-propylene copolymer fraction (C) is higher than the ethylene content of the second elastomeric ethylene-propylene copolymer fraction (D).

More preferably, the ratio between the ethylene content of fraction (C) and fraction (D) is higher than 1.5.

Preferably, the ethylene content of each of the elastomeric ethylene-propylene copolymer fractions (C) and (D) is at least 15 wt %.

Preferably, the ethylene content of each of the elastomeric ethylene-propylene copolymer fractions (C) and (D) is not higher than 75 wt %.

Preferably, the ethylene content of the first elastomeric ethylene-propylene copolymer fraction (C) is at least 55 wt %.

Preferably, the ethylene content of the first elastomeric ethylene-propylene copolymer fraction (C) is not higher than 75 wt %.

Preferably, the ethylene content of the second elastomeric ethylene-propylene copolymer fraction (D) is at least 15 wt %.

Preferably, the ethylene content of the second elastomeric ethylene-propylene copolymer fraction (D) is not higher than 30 wt %.

Preferably, the melt flow rate $MFR_2$ of said ethylene homo- or copolymer fraction (E) is at least 5 g/10 min. The $MFR_2$ of said ethylene homo- or copolymer fraction will be usually not higher than 100 g/10 min.

Preferably, said ethylene homo- or copolymer fraction (E) has an ethylene content of at least 80 mol %. More preferably, said fraction (E) is an ethylene homopolymer fraction.

Said ethylene homo- or copolymer fraction (E) will contribute to a great extend to the dispersed phase and thereby fine-tunes the density of the dispersed phase in view of the density of the matrix phase which is normally higher than the density of the dispersed phase.

The heterophasic polypropylene composition according to the present invention may be further defined by the analytical fractions which are soluble (XCS) and insoluble (XCU) in xylene, as well as the amorphous phase ($XS_{AM}$). Said analytical fractions may be further specified.

Preferably, the intrinsic viscosity of the amorphous phase $XS_{AM}$ is at least 0.8 dl/g, more preferably at least 0.9 dl/g.

Preferably, the intrinsic viscosity of the amorphous phase $XS_{AM}$ is not higher than 2.0 dl/g, more preferably not higher than 1.5 dl/g.

Preferably, the ethylene content of the amorphous phase $XS_{AM}$ is at least 40 wt %, more preferably at least 45 wt %.

Preferably, the ethylene content of the amorphous phase $XS_{AM}$ is not higher than 75 wt %, more preferably not higher than 70 wt %.

The heterophasic polypropylene composition according to the present invention is further specified by its lamellar thickness distribution. It has been recognized that higher thermal stability is achievable in case the polymer comprises at least a certain amount of thick crystal lamellae. The stepwise isothermal segregation technique (SIST) provides a possibility to determine the lamellar thickness distribution. Certain amounts of polymer fractions melting at rather high temperatures indicate the presence of thick lamellae, the respective correlation being provided by the well-known Gibbs-Thompson equation.

Therefore, the heterophasic polypropylene composition according to the present invention preferably comprises between 45 and 65 wt % of crystal lamellae having a thickness of at least 14.0 nm as determined by the SIST technique described further below, more preferably between 50 and 60 wt %.

Preferably, the tensile modulus of the heterophasic polypropylene composition is at least 900 MPa, more preferably at least 1000 MPa.

The tensile modulus of the heterophasic polypropylene composition will usually not be higher than 5000 MPa.

The Charpy impact strength notched of the heterophasic polypropylene composition at 23° C. is preferably in the range of 4.0 to 10.0 kJ/m².

The Charpy impact strength notched of the heterophasic polypropylene composition at 0° C. is preferably in the range of 2.0 to 5.0 kJ/m².

The Charpy impact strength notched of the heterophasic polypropylene composition at −20° C. is preferably in the range of 1.8 to 3.0 kJ/m².

Preferably, the haze of the heterophasic polypropylene composition (1 mm injection molded plaque samples) is lower than 50%, more preferably lower than 45%, still more preferably lower than 40%. The haze of the heterophasic polypropylene composition is usually higher than 1%.

Preferably, the haze of the heterophasic polypropylene composition (2 mm injection molded plaque samples) is lower than 80%, more preferably lower than 75%, still more preferably lower than 70%. The haze of the heterophasic polypropylene composition is usually higher than 1%.

Preferably, the ratio between the tensile modulus and the haze of the heterophasic polypropylene composition (1 mm injection molded plaque samples) is higher than 27.0, more preferably higher than 28.0, still more preferably higher than 29.0. Said ratio will usually be not higher than 100.

Preferably, the ratio between the tensile modulus and the haze of the heterophasic polypropylene composition (2 mm injection molded plaque samples) is 15.0 or higher. Said ratio will usually be not higher than 50.

The heterophasic polypropylene composition according to the present invention apart from the polymeric components may comprise non-polymeric components, e.g. additives for different purposes. The entirety of polymeric components constitutes the so-called base resin.

Usually any non-polymeric additives are added to the base resin by compounding.

The heterophasic polypropylene composition according to the present invention comprises two phases which are not miscible, i.e. a matrix phase and a dispersed phase. This definition and denotation is based on the final appearance of the heterophasic polypropylene composition.

However, a base resin of a heterophasic polypropylene composition is usually not prepared by blending (compounding or reactor blend) two phases which are identical to the matrix phase and the dispersed phase.

Instead, the base resin is received by blending (compounding or reactor blend) at least two resins or polymer fractions, wherein at least one of said resins or fractions is an ethylene-propylene rubber and at least one of said resins or fractions is a propylene homopolymer or a propylene random copolymer.

Most of said ethylene-propylene rubber resin or fraction will contribute to the dispersed phase of the base resin. Hence, the dispersed phase is often used as synonym for the ethylene-propylene rubber part of a heterophasic polypropylene composition.

Similarly, most of the resin or fraction comprising at least a propylene homopolymer fraction or a random propylene copolymer fraction will contribute to the matrix phase of the base resin. Hence, the matrix phase is often used as synonym for the propylene homopolymer or propylene random copolymer part of a heterophasic polypropylene composition.

The heterophasic polypropylene composition according to the present invention comprises a propylene homopolymer fraction (A) and a propylene random copolymer fraction (B). As indicated above, most of said at least two fractions will contribute to the matrix phase.

The heterophasic polypropylene composition according to the present invention comprises at least two different ethylene-propylene rubber fractions (C) and (D). As indicated above, most of said at least two fractions will contribute to the dispersed phase.

Said ethylene homo- or copolymer fraction (E) will, contribute to a great extend to the dispersed phase.

As indicated above, the propylene homopolymer fraction (A) preferably has a higher $MFR_2$-value than the propylene random copolymer fraction (B). Hence, the propylene homopolymer fraction (A) and the propylene random copolymer fraction (B) preferably have a different weight average molecular weight.

Hence, the matrix phase is preferably multimodal, more preferably bimodal.

The heterophasic polypropylene composition according to the present invention comprises a propylene homopolymer fraction (A), a propylene random copolymer fraction (B) and two ethylene-propylene rubber fractions (C) and (D) as further defined above. In case said at least four fractions are prepared individually and the resulting resins are compounded afterwards, the properties of the four fractions may be measured directly.

However, it is preferred according to the present invention that the at least four fractions are produced in a different reactor each, which reactors are connected in series, and each fraction is produced in the presence of the product of the preceding reactor(s) except for the first fraction.

Preferably, the ethylene homo- or copolymer fraction (E) is added after blending (compounding or reactor blend) of the at least four fractions (A) to (D) defined above in a step of compounding.

Preferably, the inventive composition comprises a propylene homo- or copolymer fraction received from a step of pre-polymerization which is carried out before the polymerization of the first fraction as defined above. More preferably, said fraction is a propylene homopolymer fraction.

Owing to the preferred sequential production of the at least four fractions (A) to (D) it is not possible to measure each of the properties of the individual at least four fractions discussed above.

Generally speaking, it is not possible to divide a final base resin or heterophasic polypropylene composition into the fractions the base resin was built-up by in the production process.

Hence, properties of the final composition or of fractions directly obtainable from the final composition as the XCU fraction, the XCS fraction and the amorphous phase $XS_{AM}$ are usually used for characterization.

The XCU fraction, the XCS fraction and the amorphous phase $XS_{AM}$ are analytical fractions. They are neither strongly related to the matrix phase and the dispersed phase of the heterophasic polypropylene composition according to the present invention nor to the at least five resins or fractions as defined above which contribute to the production of the base resin of the heterophasic polypropylene composition according to the present invention.

However, the XCS fraction gives a good idea of the dispersed phase and therefore also of the at least two ethylene-propylene rubber fractions (C) and (D). The XCU fraction therefore gives a good idea of the matrix phase and therefore also of the propylene homopolymer fraction (A) and the propylene random copolymer fraction (B). Of course also the matrix phase to a minor extend contributes to the XCS fraction, i.e. also part of the propylene homopolymer fraction (A) and the propylene random copolymer fraction (B). Still further, the ethylene homo- or copolymer fraction (E) contributes to the XCU fraction.

The amorphous phase $XS_{AM}$ is derived from the XCS fraction. The amorphous phase $XS_{AM}$ gives an even better idea of the dispersed phase and the at least two ethylene-propylene rubber fractions (C) and (D).

The heterophasic polypropylene composition preferably comprises 0.0001-3 wt % of a nucleation agent.

Preferred nucleating agents are alpha-nucleating agents such as talc, polymerised vinyl compounds such as polyvinylcyclohexane, dibenzylidene sorbitol, 1,2,3-desoxy-4,6;5, 7-bis(4-propylbenzylidene)nonitol, sodium benzoate, and di(alkylbenzylidene)sorbitol or mixtures thereof. The alpha-nucleating agent is usually added in small amounts of 0.0001 to 1 wt %, more preferably 0.001 to 0.7 wt %. When added as a nucleating agent, talc is preferably added in an amount of 0.05 to 3 wt %, more preferably 0.1 to 2 wt. %, most preferably less than 1 wt %, based on the weight of the entire polymer composition. Further details about these nucleating agents can be found e.g. in WO 99/24479 and WO 99/24501.

Further preferred nucleating agents or clarifiers are Bicyclo(2.2.1)heptane-2,3-dicarboxylic acid disodium salt and N-[3,5-bis-(2,2)-dimethyl-propionylamino)-phenyl]-2,2-dimethyl-propionamide.

The heterophasic polypropylene composition according to the present invention may comprise further polyolefin fractions and may also contain non-polymeric additives.

The expression "multimodal" used herein refers to the modality of the polymer, i.e. the form of its molecular weight distribution curve, which is the graph of the molecular weight fraction as a function of its molecular weight. As is explained herein, the polymer components of the present invention can be produced in a sequential step process, using reactors in serial configuration and operating at different reaction conditions. As a consequence, each fraction prepared in a specific reactor will have its own molecular weight distribution. When the molecular weight distribution curves from these fractions are superimposed to obtain the molecular weight distribution curve of the final polymer, that curve may show two or more maxima or at least be distinctly broadened when compared with curves for the individual fractions. Such a polymer, produced in two or more serial steps, is called bimodal or multimodal, depending on the number of steps.

The matrix phase is also multimodal, preferably bimodal, as regards the comonomer distribution, since it is to a great extend composed of a propylene homopolymer fraction (A) and a propylene random copolymer fraction (B) as defined above.

The dispersed phase is also multimodal, preferably bimodal, as regards the ethylene distribution since it is to a great extend composed of at least two ethylene-propylene rubber fractions (C) and (D) having different ethylene content.

The present invention also provides a process for the preparation of a heterophasic polypropylene composition comprising preparation of the fractions (A), (B), (C) and (D) as defined above in any sequence, wherein the fractions are produced in different reactors connected in series and each fraction is produced in the presence of the product produced in the preceding reactor(s) except for the first fraction. Said process further includes adding of fraction (E) in a step of compounding.

The present invention is also directed to a heterophasic polypropylene composition produced by a process as described above. The preferred embodiments for the process are therefore also valid for the heterophasic polypropylene composition produced by said process.

In a preferred embodiment of the process, a heterophasic polypropylene composition according to any of the embodiments as described hereinbefore is produced.

Preferably, the reaction mixture of each of the reactors is fed directly to the following reactor in the cascade.

Preferably, the propylene homopolymer fraction (A) is produced in a bulk reactor, which still more preferably is a loop reactor.

Preferably, the propylene random copolymer fraction (B) is produced in a gas phase reactor.

Preferably, the two ethylene-propylene rubber fractions (C) and (D) are produced in a gas phase reactor each.

Preferably, the propylene random copolymer fraction (B) is produced after and in the presence of the propylene homopolymer fraction (A).

Preferably, the second ethylene-propylene rubber fraction (D) is produced after and in the presence of the first ethylene-propylene rubber fraction (C).

Preferably, the two ethylene-propylene rubber fractions (C) and (D) are produced directly after each other and after and in the presence of the propylene homopolymer fraction (A) and the propylene random copolymer fraction (B).

According to a particular preferred embodiment each of said fractions (A) to (D) and optionally further fractions is produced in a different reactor, which reactors are connected in series, and each fraction is produced in the presence of the product of the preceding reactor(s) except for the first fraction in the sequence propylene homopolymer fraction (A), propylene random copolymer fraction (B), first ethylene-propylene rubber fraction (C), second ethylene-propylene rubber fraction (D), wherein the propylene homopolymer fraction (A) is produced in a loop reactor and the propylene random copolymer fraction (B), the first ethylene-propylene rubber fraction (C) and the second ethylene-propylene rubber fraction (D) in gas phase reactors.

Preferably, in addition as a first step a pre-polymerization of a propylene homo- or copolymer fraction is carried out.

For the present invention, conventional bulk phase and gas phase reactors, which are commonly known in the relevant technical field can be used. Preferably, the bulk phase reactors are conducted in a continuous loop arrangement, i.e. so-called loop reactors.

The gas-phase polymerisation reactor preferably comprises one or more vertical fluidised beds. Nitrogen and monomers in the gaseous state, as well as the catalyst are preferably fed to the reactor and the solid product is removed continuously or periodically, preferably continuously. The heat of reaction is dissipated through the use of the circulating gas that also serves to fluidise the polymer bed. Solvents are not used, thereby eliminating the need for solvent stripping, washing and drying.

The conditions for preparation of the two fractions (A) and (B) are within the limits of conventional conditions for preparation of propylene homopolymers and random copolymers and are disclosed e.g. in EP 2 014 714.

In general, the conditions for the preparation of the elastomeric copolymer fractions are within the limits of conventional conditions for ethylene-propylene rubber (EPM) production. Typical conditions are disclosed e.g. in Encyclopaedia of Polymer Science and Engineering, second edition, vol. 6, p. 545-558.

In the process a catalyst for the preparation of the polypropylene composition is applied. This catalyst can be any stereo-specific catalyst for propylene polymerisation, which preferably is capable of catalysing the polymerisation and copolymerisation of propylene and comonomers at a pressure of 500 to 10000 kPa, in particular 2500 to 8000 kPa, and at a temperature of 40 to 110° C., in particular of 60 to 110° C. Preferably, the catalyst comprises a high-yield Ziegler-Natta type catalyst, which can be used at high polymerisation temperatures of 80° C. or more. Further preferred catalysts are metallocene catalysts.

Suitable external donors include dicyclo pentyl dimethoxy silane (donor D), cyclo hexyl methyl dimethoxy silane (donor C), diethylaminotriethoxysilane (donor U).

The Al/Do-ratio may vary to a great extend. The higher the ratio, the better the $H_2$-response thereby allowing producing polymers with higher values of $MFR_2$, hence having a higher flowability. The ratio is usually between 2 and 60 mol/mol.

The catalyst is preferably present in the first polymerization step and is transferred together with the product to further polymerization steps.

Further information about suitable catalysts is disclosed in EP 2 014 714.

Preferably, the inventive process further comprises adding 0.0001-3 wt % of a nucleation agent in a step of compounding.

In addition to the components discussed above, the inventive heterophasic polypropylene composition may comprise conventional adjuvants, such as additives and reinforcing agents or additional impact modifiers.

The following are optional additives: process and heat stabilisers, pigments and other colouring agents including carbon black, antioxidants, antistatic agents, slip agents, UV stabilisers, acid scavengers.

Depending on the type of additive, these may be added in an amount of 0.001 to 2 wt %, based on the weight of the polypropylene composition.

The nucleating agent and optionally further additives are added to the heterophasic polypropylene base resin, which is collected from the final reactor of the series of reactors, to generate the heterophasic polypropylene composition of the invention. In case the base resin is prepared by compounding of the at least five fractions defined above, any additives may be added together or after said compounding step. In case of a rector blend of fractions (A)-(D), the addition of any additives may be carried out together or after addition of the ethylene homo- or copolymer fraction (E).

Preferably, these additives are mixed into the composition prior to or during the extrusion process in a one-step compounding process.

Alternatively, a master batch may be formulated, wherein the heterophasic polypropylene base resin is first mixed with only some of the additives.

For mixing, a conventional compounding or blending apparatus, e.g. a Banbury mixer, a 2-roll rubber mill, Buss-co-kneader or a twin screw extruder may be used. The twin screw extruder may be co-rotating or counter-rotating, preferably co-rotating. Preferably, the composition will be prepared by blending the additives together with the polymeric material at a temperature, which is sufficiently high to soften and plasticize the polymer. The temperatures and pressures used in the operation of the extruder are known in the art. Typically the temperature may be selected from the range of 150 to 350° C. The pressure used for extrusion preferably is 50 to 500 bar. The polymer materials recovered from the extruder are usually in the form of pellets. These pellets are then preferably further processed, e.g. by injection moulding to generate articles and products of the inventive compositions.

The compositions of the current invention are preferably used for the production of moulded articles, preferably injection moulded articles or injection stretch blow moulded (ISBM) articles. Even more preferred is the use for the production of thin-walled containers and packaging articles, preferably plastic cups, house-wares and food packages.

The current invention also provides articles comprising the inventive heterophasic polypropylene composition. Preferably, these articles are produced by injection moulding or injection stretch blow moulding.

Measurement Methods a) Molecular Weight

The weight average molecular weight $M_w$ and the molecular weight distribution (MWD=$M_w/M_n$ wherein $M_n$ is the number average molecular weight and $M_w$ is the weight average molecular weight) is measured by a method based on ISO 16014-4:2003. A Waters 150CV plus instrument was used with column 3×HT&E styragel from Waters (divinylbenzene) and trichlorobenzene (TCB) as solvent at 140° C. The column set was calibrated using universal calibration with narrow MWD PS standards (the Mark-Houwink constant K: $9.54*10^{-5}$ and a: 0.725 for PS, and K: $1.91*10^4$ and a: 0.725 for PP). The ratio of $M_w$ and $M_n$ is a measure of the broadness of the distribution, since each is influenced by the opposite end of the "population".

b) Melt Flow Rate

The melt flow rate is measured as the $MFR_2$ in accordance with ISO 1133 (230° C., 2.16 kg load) for polypropylene and in accordance with ISO 1133 (190° C., 2.16 kg load) for polyethylene and is indicated in g/10 min. The MFR is an indication of the flowability, and hence the processability, of the polymer. The higher the melt flow rate, the lower the viscosity of the polymer.

The $MFR_2$ of a fraction (B) produced in the presence of a fraction (A) is calculated using the measured values of $MFR_2$ of fraction (A) and the mixture received after producing fraction (B) ("final"):

$$\frac{1}{(\log_{10}MFR_2(\text{final}))} = \frac{\text{weight fraction}(A)}{(\log_{10}MFR_2(A))} + \frac{\text{weight fraction}(B)}{(\log_{10}MFR_2(B))}$$

c) Xylene Solubles and Amorphous Phase

The xylene soluble fraction (XCS) as defined and described in the present invention is determined as follows: 2.0 g of the polymer are dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (wt %) can then be determined as follows:

$$XCS=(100 \times m_1 \times v_0)/(m_0 \times v_1),$$

wherein $m_0$ designates the initial polymer amount (g), $m_1$ defines the weight of residue (grams), $v_0$ defines the initial volume (ml) and $v_1$ defines the volume of the analysed sample (ml).

The fraction insoluble in p-xylene at 25° C. (XCU) is then equal to 100 wt % minus XCS.

The solution from the second 100 ml flask was treated with 200 ml of acetone under vigorous stirring. The precipitate was filtered and dried in a vacuum oven at 90° C. This solution can be employed in order to determine the amorphous part (AM) of the polymer (wt %) using the following equation:

$$AM=(100 \times m_1 \times v_0)/(m_0 \times v_1)$$

wherein $m_0$ designates the initial polymer amount (g), $m_1$ defines the weight of residue (g), $v_0$ defines the initial volume (ml) and $v_1$ defines the volume of the analysed sample (ml).

d) Comonomer Content

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N=k1(A/R)+k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 cm$^{-1}$) or block-like (720 cm$^{-1}$). The absorbance at 4324 cm$^{-1}$ was used as a reference band.

e) Melting Temperature, Crystallization Temperature

The melting temperature $T_m$, crystallisation temperature $T_c$ and degree of crystallinity are measured with a Mettler TA820 differential scanning calorimetry device (DSC) on 3±0.5 mg samples according to ISO 11357-3:1999. Crystallisation and melting temperatures are obtained during 10° C./min cooling and heating scans between 30° C. and 225° C. Melting and crystallisation temperatures were taken as the peaks of the endotherms and exotherms. The degree of crystallinity is calculated by comparison with the heat or fusion of a perfectly crystalline polypropylene, i.e. 209 J/g.

f) Stepwise Isothermal Segregation Technique (SIST)

The isothermal crystallisation for SIST analysis was performed in a Mettler TA820 DSC on 3±0.5 mg samples at decreasing temperatures between 200° C. and 105° C. as also described in Journal of Applied Polymer Science, Vol. 95, 1073-1081 (2005):
- (i) The samples were melted at 225° C. for 5 min,
- (ii) then cooled with 80° C./min to 145° C.,
- (iii) held for 2 hours at 145° C.,
- (iv) then cooled with 80° C./min to 135° C.,
- (v) held for 2 hours at 135° C.,
- (vi) then cooled with 80° C./min to 125° C.,
- (vii) held for 2 hours at 125° C.,
- (viii) then cooled with 80° C./min to 115° C.,
- (ix) held for 2 hours at 115° C.,
- (x) then cooled with 80° C./min to 105° C., and
- (xi) held for 2 hours at 105° C.

After the last step the sample was cooled down to ambient temperature, and the melting curve was obtained by heating the cooled sample at a heating rate of 10° C./min up to 200° C.

All measurements were performed in a nitrogen atmosphere. The melt enthalpy is recorded as a function of temperature and evaluated through measuring the melt enthalpy of fractions melting within temperature intervals.

The melting curve of the material crystallised this way can be used for calculating the lamella thickness distribution (see FIG. 1) according to the Gibbs-Thomson equation:

$$T_m = T_0 \left(1 - \frac{2\sigma}{\Delta H_0 \cdot L}\right)$$

where $T_0 = 457$ K, $\Delta H_0 = 184 \cdot 10^6$ J/m$^3$, $\sigma = 0.049$ J/m$^2$ and $L$ is the lamella thickness.

The melt enthalpy [J/g] of each fraction of the polymer sample as defined above is obtained as follows: In general the melt enthalpy is calculated from the quotient of the heat flow volume and initial weight of the sample. The heat flow volume is recorded as function of temperature, i.e. the melting curve. The area above each minimum (includes also shoulders) of the melting curve represents its melt enthalpy. The integration limits for each area to be calculated are defined by relative maxima (includes also shoulders) and by the intersection points of the base line with the melting curve, in the direct neighbourhood of each minimum of the melting curve.

The maxima, minima, shoulders of the melting curve as well as the areas are determined as known from DSC-curves. Accordingly the relative maxima may be mathematically understood, i.e. a point x* is a relative maximum of a function f if there exists some $\epsilon > 0$ such that $f(x^*) \geq f(x)$ for all x with $|x - x^*| < \epsilon$. Furthermore, in case of shoulders, the first derivative of the function (the measured melting curve) must lead to a relative maximum at the relative maximum of said function. Excluded are those inflection points that are located between two relative extrema.

g) Charpy Notched Impact Strength

Charpy notched impact is measured according to ISO 179/1eA at +23° C., and at 0° C. and −20° C. using an injection moulded test specimen (80×10×4 mm) as produced according to ISO1873.

h) Tensile Strength, Tensile Modulus

The tensile strength, including tensile stress at yield, strain at yield and elongation at break, is measured according to ISO 527-1 (cross head speed 50 mm/min). The tensile modulus is measured according to ISO 527-1 (cross head speed 1 mm/min) using injection molded specimens according to ISO 527-2(1B), produced according to EN ISO 1873-2 (dog bone shape, 4 mm thickness).

i) Haze

Haze and transparency are determined from 1 mm or 2 mm injection molded plaque samples according to ASTM D1003.

j) Intrinsic Viscosity (IV)

The intrinsic viscosity (IV) value increases with the molecular weight of a polymer. The IV values e.g. of the amorphous phase were measured according to ISO 1628-3.

k) E-Puncture

The puncture energy is measured in biaxial penetration tests according to ISO 6603-2 using a lubricated bolt on plaques, 60×60×3 mm$^3$, injection molded according to ISO 1873-2, with a test-speed of 4.4 m/sec.

EXAMPLES

Ten heterophasic polypropylene compositions have been produced in four reactors connected in series. The properties of the products obtained from the individual reactors including the final resins are given in Tables 1-3. Table 1 contains the values for inventive Examples 1 and 2, Tables 2 and 3 the corresponding values for Comparative Examples 1-8.

Two further heterophasic polypropylene compositions have been produced in four reactors connected in series, wherein in the last reactor a polyethylene fraction is produced. The properties of the products obtained from the individual reactors including the final resins are given in Table 4, Comparative Examples 9 and 10.

In each of said Examples the first fraction has been produced in a loop reactor, fractions two to four have been produced in gas phase reactors.

The properties of the products obtained from the individual reactors naturally are not measured on homogenized material but on reactor samples (spot samples). The properties of the final resin are measured on homogenized material, the MFR$_2$ on pellets made thereof.

The catalyst used in the polymerization processes was the commercial BCF20P catalyst (1.9 wt % Ti-Ziegler-Natta-catalyst as described in EP 591 224) of Borealis with triethyl-aluminium (TEA) as co-catalyst and dicyclo pentyl dimethoxy silane as donor.

The Al/donor D ratio was 15.0 in Examples 1 and 2, 10.2 in Comparative Examples 1 and 2, 10.1 in Comparative Examples 3-8, and 10.0 in Comparative Examples 9 and 10.

TABLE 1

|  | Example 1 | Example 2 |
|---|---|---|
| Loop reactor |  |  |
| MFR$_2$/g/10 min/IV/dl/g | 280/0.91 | 250/0.93 |
| Xylene solubles/wt % | 2.6 | 2.6 |
| Ethylene content/wt % | 0 | 0 |
| Split/wt % | 58 | 59 |
| Gas phase reactor GPR$_1$ |  |  |
| MFR$_2$/g/10 min/IV/dl/g | 49/1.45 | 59/1.36 |
| Xylene solubles/wt % | 2.9 | 2.9 |
| Ethylene content/wt % | 1.0 | 0.8 |
| Split/wt % | 42 | 41 |

TABLE 1-continued

|  | Example 1 | Example 2 |
|---|---|---|
| Gas phase reactor GPR$_2$ | | |
| MFR$_2$/g/10 min | 45 | 50 |
| Xylene solubles/wt % | 12.4 | 11.5 |
| Ethylene content XS$_{AM}$/wt % | 63 | 63 |
| Intrinsic viscosity XS$_{AM}$/dl/g | 1.0 | 1.1 |
| Gas phase reactor GPR$_3$ | | |
| MFR$_2$/g/10 min | 39 | 40 |
| Xylene solubles/wt % | 15.7 | 16.1 |
| Ethylene content XS$_{AM}$/wt % | 49 | 50 |
| Intrinsic viscosity XS$_{AM}$/dl/g | 0.9 | 1.0 |
| Final resin | | |
| MFR$_2$/g/10 min (pellet) | 36 | 44 |
| Xylene solubles/wt % | 16.6 | 15.6 |
| Ethylene content XS$_{AM}$/wt % | 50.4 | — |
| Intrinsic viscosity XS$_{AM}$/dl/g | 1.1 | 1.2 |

TABLE 2

|  | Comp. Ex. 1 | Comp. Ex. 2 | Comp. Ex. 3 | Comp. Ex. 4 |
|---|---|---|---|---|
| Loop reactor | | | | |
| MFR$_2$/g/10 min/IV/dl/g | 92/1.18 | 78/1.22 | 71/1.25 | 71/1.25 |
| Xylene solubles/wt % | 1.8 | 2.0 | 2.2 | 2.0 |
| Ethylene content/wt % | 0.0 | 0.0 | 0.9 | 1.6 |
| Split/wt % | 65 | 66 | 64 | 62 |
| Gas phase reactor GPR$_1$ | | | | |
| MFR$_2$/g/10 min/IV/dl/g | 69/1.26 | 63/1.29 | 55/1.33 | 73/1.25 |
| Xylene solubles/wt % | 1.5 | 2.0 | 2.1 | 2.4 |
| Ethylene content/wt % | 0.0 | 0.0 | 1.0 | 1.0 |
| Split/wt % | 35 | 34 | 36 | 38 |
| Gas phase reactor GPR$_2$ | | | | |
| MFR$_2$/g/10 min | 66 | 56 | 46 | 47 |
| Xylene solubles/wt % | 11.4 | 11.4 | 11.5 | 12.4 |
| Ethylene content XS$_{AM}$/wt % | 59 | 60 | 64 | 65 |
| Intrinsic viscosity XS$_{AM}$/dl/g | 1.1 | 1.2 | 1.2 | 1.2 |
| Gas phase reactor GPR$_3$ | | | | |
| MFR$_2$/g/10 min | 62 | 51 | 40 | 42 |
| Xylene solubles/wt % | 14.0 | 14.7 | 16.6 | 17.9 |
| Ethylene content XS$_{AM}$/wt % | 51 | 49 | 52 | 52 |
| Intrinsic viscosity XS$_{AM}$/dl/g | 1.2 | 1.2 | 1.3 | 1.3 |
| Final resin | | | | |
| MFR$_2$/g/10 min (pellet) | 51 | 47 | 38 | 38 |
| Xylene solubles/wt % | 13.6 | 16.8 | 17.4 | 18.1 |
| Ethylene content XS$_{AM}$/wt % | 55.0 | 53.0 | 51.0 | 48.4 |
| Intrinsic viscosity XS$_{AM}$/dl/g | 1.1 | 1.3 | 1.4 | 1.4 |

TABLE 3

|  | Comp. Ex. 5 | Comp. Ex. 6 | Comp. Ex. 7 | Comp. Ex. 8 |
|---|---|---|---|---|
| Loop reactor | | | | |
| MFR$_2$/g/10 min/IV/dl/g | 40/1.43 | 43/1.41 | 45/1.39 | — |
| Xylene solubles/wt % | 2.1 | 2.4 | 2.4 | 3.2 |
| Ethylene content/wt % | 0.8 | 1.0 | 0.7 | 0.6 |
| Split/wt % | 61 | 63 | 64 | 75 |
| Gas phase reactor GPR$_1$ | | | | |
| MFR$_2$/g/10 min/IV/dl/g | 43/1.41 | 33/1.50 | 34/1.49 | 37/1.46 |
| Xylene solubles/wt % | 2.3 | 2.0 | 2.0 | 2.5 |
| Ethylene content/wt % | 0.7 | 0.6 | 0.8 | 0.8 |
| Split/wt % | 39 | 37 | 36 | 25 |
| Gas phase reactor GPR$_2$ | | | | |
| MFR$_2$/g/10 min | 34 | 30 | 33 | 33 |
| Xylene solubles/wt % | 12.6 | 13.7 | 10.4 | 7.9 |
| Ethylene content XS$_{AM}$/wt % | 63 | 62 | 61 | 62 |
| Intrinsic viscosity XS$_{AM}$/dl/g | 1.1 | 1.2 | 1.2 | 1.3 |
| Gas phase reactor GPR$_3$ | | | | |
| MFR$_2$/g/10 min | 40 | 27 | 29 | 31 |
| Xylene solubles/wt % | 16.1 | 18.2 | 17.5 | 13.4 |
| Ethylene content XS$_{AM}$/wt % | 51 | 49 | 48 | 50 |
| Intrinsic viscosity XS$_{AM}$/dl/g | 1.6 | 1.4 | 1.2 | 1.3 |

TABLE 3-continued

|  | Comp. Ex. 5 | Comp. Ex. 6 | Comp. Ex. 7 | Comp. Ex. 8 |
|---|---|---|---|---|
| Final resin |  |  |  |  |
| $MFR_2$/g/10 min (pellet) | 26 | 27 | 30 | 30 |
| Xylene solubles/wt % | 18.8 | 18.3 | 14.5 | 8.8 |
| Ethylene content $XS_{AM}$/wt % | 49.2 | 51.0 | 50.1 | 55.6 |
| Intrinsic viscosity $XS_{AM}$/dl/g | 1.4 | 1.3 | 1.2 | 1.1 |

TABLE 4

|  | Comp. Ex. 9 | Comp. Ex. 10 |
|---|---|---|
| Loop reactor |  |  |
| $MFR_2$/g/10 min/IV/dl/g | 64/1.29 | 85.0/1.20 |
| Xylene solubles/wt % | 1.6 | 1.6 |
| Ethylene content/wt % | 0.0 | 0.0 |
| Split/wt % | 71 | 72 |
| Gas phase reactor $GPR_1$ |  |  |
| $MFR_2$/g/10 min/IV/dl/g | 67/1.27 | 80/1.22 |
| Xylene solubles/wt % | 1.2 | 1.2 |
| Ethylene content/wt % | 0.0 | 0.0 |
| Split/wt % | 29 | 28 |
| Gas phase reactor $GPR_2$ |  |  |
| $MFR_2$/g/10 min | 49 | 56 |
| Xylene solubles/wt % | 13.1 | 12.8 |
| Ethylene content $XS_{AM}$/wt % | 22.0 | 27.0 |
| Intrinsic viscosity $XS_{AM}$/dl/g | 1.1 | 1.3 |
| Gas phase reactor $GPR_3$ |  |  |
| $MFR_2$/g/10 min | 38.0 | 45.0 |
| Xylene solubles/wt % | 11.0 | 10.0 |
| Ethylene content $XS_{AM}$/wt % | 21.0 | 22.0 |
| Intrinsic viscosity $XS_{AM}$/dl/g | 1.5 | 1.2 |
| Final resin |  |  |
| $MFR_2$/g/10 min (pellet) | 45.0 | 45.0 |
| Xylene solubles/wt % | 13.3 | 12.1 |
| Ethylene content $XS_{AM}$/wt % | 26.5 | 22.7 |
| Intrinsic viscosity $XS_{AM}$/dl/g | 1.5 | 1.8 |

The split between the loop reactor and the first gas phase reactor is given in Tables 1-4. The relative weight of fractions three and four produced in the second and third gas phase reactor is easily derivable from the xylene solubles content: Fractions three and four are rubber fractions which are fully soluble in xylene. The difference to the value of the first two fractions gives information about the relative weight of said rubber fractions.

Comparative Examples 1, 2, 9 and 10 differ from the Examples 1 and 2 according to the invention in that both matrix components (A) and (B) relate to propylene homopolymer fractions, whereas both matrix components (A) and (B) of Comparative Examples 3, 5, 7 and 8 relate to ethylene-propylene random copolymer fractions. Comparative Examples 4 and 6 include an ethylene-propylene random copolymer fraction polymerizied in the loop reactor and a propylene homopolymer fraction polymerized in the first gas phase reactor ($GPR_1$) as matrix components. Thus, Comparative Examples 4 and 6 differ from Examples 1 and 2 according to the invention in that the propylene homopolymer fraction (A) and the propylene random copolymer fraction (B) of the matrix phase have the same intrinsic viscosity (Comp. Ex. 4) or the intrinsic viscosity of the propylene homopolymer fraction (A) is even higher than that of the propylene random copolymer fraction (Comp. Ex. 6).

The same additive package has been added to the resins obtained from the final reactor in Examples 1 and 2 and in Comparative Examples 1-8. The additive package added to the resins of Comparative Examples 9 and 10 was similar but did not contain additional polyethylene. Table 5 gives an overview over the additives. The remainder in each of the compositions (100 wt % in total) is the respective resin obtained from the final reactor.

Irganox 1010 is Pentaerythrityl-tetrakis(3-(3',5'-di-tert. butyl-4-hydroxyphenyl)-propionate, CAS-no. 6683-19-8.

Irgafos 168 is Tris(2,4-di-t-butylphenyl) phosphate, CAS-no. 31570-04-4).

Calcium stearate has been supplied by Croda Polymer Additives, CAS-no. 1592-23-0.

GMS (supplied by Croda Polymer Additives) is a glycerol ester of stearic acid, CAS-no. 97593-29-8.

Millad 3988 (supplied by Milliken Inc.) is 1,3:2,4 Bis(3,4-dimethylbenzylidene)sorbitol, CAS-no. 135861-56-2).

CA9150 is a low density ethylene homopolymer having an $MFR_2$ of 15 g/10 min and a density of 915 kg/m$^3$ and is commercially available from Borealis.

TABLE 5

| Additives added to resins obtained from the final reactor | | |
|---|---|---|
|  | Examples 1 and 2, Comparative Examples 1-8 | Comparative Examples 9 and 10 |
| Irganox 1010/ppm | 531 | 531 |
| Irgafos 168/ppm | 531 | 531 |
| Calcium stearate/ppm | 531 | 531 |
| Millad 3988/ppm | 1807 | 1807 |
| GMS/ppm | 800 | 800 |
| CA9150/wt % | 15 | — |

The properties of the final heterophasic polypropylene compositions are shown in Tables 6-9.

A comparison of various values of the Examples shows the improved balance of properties of the compositions according to the present invention.

The flowability shown by the value of $MFR_2$ is comparable in Examples 1 and 2 on the one hand and in Comparative Examples 2, 3 and 4 on the other hand. However, the stiffness shown by the tensile modulus is improved (Example 1, Comparative Examples 3 and 4) or comparable (Example 2, Comparative Example 2) and at the same time the values of haze are lower in the inventive Examples, which means an improvement in optical performance. The comparison also shows that the impact strength is comparable.

Comparative Example 1 shows a still higher flowability together with a higher stiffness but also higher haze values and worse impact properties.

TABLE 6

|  | Example 1 | Example 2 |
|---|---|---|
| $MFR_2$/g/10 min | 36 | 44 |
| $T_m$/° C. | 162 | 162 |
| $T_c$/° C. | 129 | 130 |
| Charpy/kJ/m², 23° C. | 5.8 | 5.8 |
| Charpy/kJ/m², 0° C. | 4.8 | 4.0 |
| Charpy/kJ/m², −20° C. | 2.0 | 1.9 |
| Tensile Modulus/MPa | 1060 | 1080 |
| Haze/%, 2 mm plaques | 69 | 69 |
| Haze/%, 1 mm plaques | 36 | 37 |

TABLE 7

|  | Comp. Ex. 1 | Comp. Ex. 2 | Comp. Ex. 3 | Comp. Ex. 4 |
|---|---|---|---|---|
| $MFR_2$/g/10 min | 51 | 47 | 38 | 38 |
| $T_m$/° C. | 165 | 165 | 160 | 159 |
| $T_c$/° C. | 125 | 125 | 122 | 122 |
| Charpy/kJ/m², 23° C. | 3.9 | 4.9 | 5.4 | 5.5 |
| Charpy/kJ/m², 0° C. | 2.2 | 2.7 | 3.5 | 3.6 |
| Charpy/kJ/m², −20° C. | 1.3 | 2.0 | 2.3 | 2.0 |
| Tensile Modulus/MPa | 1230 | 1115 | 920 | 945 |
| Haze/%, 2 mm plaques | 83 | 88 | 85 | 86 |
| Haze/%, 1 mm plaques | 49 | 55 | 51 | 51 |

TABLE 8

|  | Comp. Ex. 5 | Comp. Ex. 6 | Comp. Ex. 7 | Comp. Ex. 8 |
|---|---|---|---|---|
| $MFR_2$/g/10 min | 26 | 27 | 30 | 30 |
| $T_m$/° C. | 158 | 160 | 159 | 159 |
| $T_c$/° C. | 122 | 128 | 122 | 121 |
| Charpy/kJ/m², 23° C. | 7.7 | 8.6 | 6.6 | 4.0 |
| Charpy/kJ/m², 0° C. | 5.4 | 6.0 | 4.3 | 2.6 |
| Charpy/kJ/m², −20° C. | 2.2 | 2.9 | 2.3 | 1.2 |
| Tensile Modulus/MPa | 935 | 975 | 1050 | 1180 |
| Haze/%, 2 mm plaques | 81 | 70 | 83 | 80 |
| Haze/%, 1 mm plaques | 45 | 38 | 48 | 46 |

TABLE 9

|  | Comp. Ex. 9 | Comp. Ex. 10 |
|---|---|---|
| $MFR_2$/g/10 min | 45 | 45 |
| $T_m$/° C. | 162 | — |
| $T_c$/° C. | 129 | — |
| Charpy/kJ/m², 23° C. | 6.2 | 6.3 |
| Charpy/kJ/m², 0° C. | — | — |
| Charpy/kJ/m², −20° C. | 3.6 | 2.8 |
| Tensile Modulus/MPa | 1460 | 1520 |
| Haze/%, 2 mm plaques | 100 | 100 |
| Haze/%, 1 mm plaques | 99 | 98 |

Comparative Examples 5 to 8 all show a slightly lower flowability. The stiffness and impact properties are acceptable. However, the haze values are worse (Comparative Examples 5, 7 and 8). Comparative Example 6 also shows good haze values but combined with lower flowability and stiffness.

Comparative Examples 9 and 10 show flowability comparable to inventive Example 2. Stiffness and impact properties are good but the haze values are inferior.

Hence, only the compositions according to the present invention can provide the improved balance of properties. The improved properties of the inventive heterophasic compositions are established inter alia by the combination of a propylene homopolymer fraction and a propylene random copolymer fraction which together form the matrix phase in inventive Examples 1 and 2.

This particular combination provides a typical lamellae thickness distribution which is determined with the Stepwise Isothermal Segregation Technique (SIST).

FIG. 1 shows the results for inventive Example 2 and Comparative Examples 3 and 9.

The matrix phase of the heterophasic composition of Example 2 comprises a propylene homopolymer fraction and a propylene random copolymer fraction, whereas the matrix phases of the heterophasic compositions of Comparative Examples 3 and 9 comprise a propylene random copolymer fraction or a propylene homopolymer fraction, respectively (see Tables 1, 2 and 4).

These results are a good measure of the different properties of the resins. The ethylene content in the matrix phase is very similar in the compositions of Example 2 and Comparative Example 3 (see Tables 1 and 2, values for $GPR_1$). However, the distribution of the ethylene comonomer is of course different which yields a higher amount of thicker lamellae in the inventive Example. The highest fraction of thicker lamellae is found for Comparative Example 9 since the matrix comprises a propylene homopolymer fraction only.

Comparative Examples 1 and 2 have been produced with no addition of comonomer in the first two reactors. Hence the "matrix phase" is a homopolymer. This means high melting temperature and stiffness but inferior impact properties and haze.

Comparative Examples 3 to 8 have been produced with addition of comonomer in both of the first two reactors. Hence the "matrix phase" is a random copolymer. This means lower melting temperature and a tendency to lower stiffness, better impact properties and haze. Said Examples slightly vary in ethylene content and also in the split of the third and the forth reactor. Said variations cannot achieve a balance of properties as in the inventive Examples.

The invention claimed is:

1. A heterophasic polypropylene composition comprising
   (A) 40-70 wt % of a propylene homopolymer fraction,
   (B) 10-50 wt % of a propylene random copolymer fraction,
   (C) 1-20 wt % of a first elastomeric ethylene-propylene copolymer fraction,
   (D) 1-20 wt % of a second elastomeric ethylene-propylene copolymer fraction, and
   (E) 5-25 wt % of an ethylene homo- or copolymer fraction having a density between 905 and 925 kg/m³,
   wherein
      the ratio of intrinsic viscosity of fraction (A) to the intrinsic viscosity of combined fractions (A) and (B) is smaller than 0.9,
      the comonomer content of the propylene random copolymer fraction (B) is up to 5 wt %,
      the first elastomeric ethylene-propylene copolymer fraction (C) has a different ethylene content than the second elastomeric ethylene-propylene copolymer fraction (D), and
      the $MFR_2$ of the heterophasic polypropylene composition is at least 20 g/10 min, the values of $MFR_2$ being measured according to ISO 1133 (230° C., 2.16 kg load).

2. The heterophasic polypropylene composition according to claim 1, comprising between 45 and 65 wt % of crystal lamellae having a thickness of at least 14.0 nm as measured by stepwise isothermal segregation.

3. The heterophasic polypropylene composition according to claim 1, wherein the tensile modulus of the heterophasic polypropylene composition is at least 900 MPa.

4. The heterophasic polypropylene composition according to claim 1, wherein the haze of the heterophasic polypropylene composition is lower than 50% measured on 1 mm injection molded plaque samples.

5. The heterophasic polypropylene composition according to claim 1, wherein the haze of the heterophasic polypropylene composition is lower than 80% measured on 2 mm injection molded plaque samples.

6. The heterophasic polypropylene composition according to claim 1, wherein the ratio between the tensile modulus and the haze of the heterophasic polypropylene composition is higher than 27.0, the haze measured on 1 mm injection molded plaque samples.

7. The heterophasic polypropylene composition according to claim 1, wherein the ratio between the tensile modulus and the haze of the heterophasic polypropylene composition is 15 or higher, the haze measured on 2 mm injection molded plaque samples.

8. The heterophasic polypropylene composition according to claim 1, wherein the ratio between the ethylene content of fraction (C) and fraction (D) is higher than 1.5.

9. The heterophasic polypropylene composition according to claim 1, comprising 0.0001-3 wt % of a nucleation agent.

10. A process for the preparation of a heterophasic polypropylene composition comprising the following steps in any sequence:
  (i) preparation of 40-70 wt % of a propylene homopolymer fraction (A),
  (ii) preparation of 10-50 wt % of a propylene random copolymer fraction (B),
  (iii) preparation of 1-20 wt % of a first elastomeric ethylene-propylene copolymer fraction (C), and
  (iv) preparation of 1-20 wt % of a second elastomeric ethylene-propylene copolymer fraction (D),
wherein
  the ratio of intrinsic viscosity of fraction (A) to the intrinsic viscosity of combined fractions (A) and (B) is smaller than 0.9,
  the comonomer content of the propylene random copolymer fraction (B) is up to 5 wt %,
  the first elastomeric ethylene-propylene copolymer fraction (C) has a different ethylene content than the second elastomeric ethylene-propylene copolymer fraction (D), and
  the $MFR_2$ of the heterophasic polypropylene composition is at least 20 g/10 min, the values of $MFR_2$ being measured according to ISO 1133 (230° C., 2.16 kg load),
wherein fractions (A), (B), (C) and (D) are produced in different reactors connected in series and each fraction is produced in the presence of the product produced in the preceding reactor(s) except for the first fraction, and
wherein the process further comprises adding 5-25 wt % of an ethylene homo- or copolymer fraction (E) having a density between 905 and 925 kg/m³ in a step of compounding.

11. The process according to claim 10, which further comprises adding 0.0001-3 wt % of a nucleation agent in a step of compounding.

12. An article comprising a heterophasic polypropylene composition according to claim 1.

13. An article according to claim 12, wherein the article has been produced by injection moulding.

14. An article according to claim 12, wherein the article has been produced by injection stretch blow moulding.

* * * * *